United States Patent [19]

Leverich

[11] Patent Number: 5,166,595
[45] Date of Patent: Nov. 24, 1992

[54] SWITCH MODE BATTERY CHARGING SYSTEM

[75] Inventor: Charles G. Leverich, Skokie, Ill.
[73] Assignee: Circom Inc., Bensenville, Ill.
[21] Appl. No.: 583,697
[22] Filed: Sep. 17, 1990
[51] Int. Cl.⁵ .......................... H01M 10/44; H02J 7/10
[52] U.S. Cl. .......................................... 320/32; 320/21; 320/DIG. 1
[58] Field of Search .................. 320/4, 22, 23, 24, 25, 320/30, 32, 35, 37, 39, DIG. 1, DIG. 2, 21

[56] References Cited

U.S. PATENT DOCUMENTS

| | | | |
|---|---|---|---|
| 3,617,851 | 11/1971 | Du Puy et al. | 320/22 |
| 3,688,177 | 8/1972 | Reeves et al. | 320/24 |
| 3,854,082 | 12/1974 | Nasby et al. | 320/22 |
| 3,887,858 | 6/1975 | Burkett et al. | 320/31 |
| 4,207,513 | 6/1980 | Hess, Jr. | 320/23 |
| 4,207,515 | 6/1980 | Yukuwa | 320/59 |
| 4,260,943 | 4/1981 | Zaderej et al. | 320/21 |
| 4,433,295 | 2/1984 | Zlugg | 324/429 |
| 4,467,265 | 8/1984 | Hierholzer, Jr. | 320/17 |
| 4,472,672 | 9/1984 | Pacholok | 320/21 |
| 4,549,127 | 10/1985 | Taylor et al. | 320/21 |
| 4,584,514 | 4/1986 | Kaminski | 320/33 |
| 4,695,784 | 9/1987 | Reynolds | 320/32 |
| 4,843,299 | 6/1989 | Hutchings | 320/31 |
| 4,937,731 | 6/1990 | Konopka | 363/143 |

OTHER PUBLICATIONS

Sonnenschein Brochure entitled "Inter-Acter (Automatic Battery Charger: Model PMP".

The Battery Handbook, Rev. 1, 1980 by Alvin G. Graham, Ratelco, Inc., pp. 2 through 12.
National Semiconductor Corporation, Linear Databook, Jun. 6, 1982.

Primary Examiner—Steven L. Stephan
Assistant Examiner—D. R. Haszko

[57] ABSTRACT

A switch mode battery charging system wherein a switch mode power supply is provided which is operating at a frequency substantially above a line frequency of AC line voltage supplying the battery charging system. The system of the invention can automatically switch back and forth between an equalize mode and a float mode of operation. The system of the invention also compensates for severe line voltage variations, provides a low ripple controllable DC voltage and current output, and is compact, light weight, and highly efficient in view of its high frequency operation. Furthermore, the system of the invention provides optimized and automatic charging of batteries in various states of discharge. The system automatically senses to determine whether or not battery equalization and desulfation is necessary, and automatically determines a length of time for equalization depending upon a charge state of the battery. Thereafter, the system provides for a surface charge depletion mode followed by an automatic float mode to maintain the battery at the float voltage during storage. If the system determines that equalization is not necessary, then the float mode is instituted and the equalization charging mode does not occur.

34 Claims, 3 Drawing Sheets

SWITCH MODE BATTERY CHARGING SYSTEM

BACKGROUND OF THE INVENTION

Previous battery chargers have been expensive to construct, bulky, and relatively heavy in view of their use of line frequency transformers and filters such as transformers, inductors, and capacitors designed for 60 cycle operation. Such transformers typically have a substantial amount of core material and operate at a relatively low efficiency compared to power transformers which operate at a substantially higher frequency.

It is a disadvantage of previous battery chargers that they cannot automatically switch back and forth between a so-called "float mode" explained hereafter and a so-called "equalize mode", also explained hereafter.

For various types of applications, such battery chargers must properly charge a discharged battery, particularly one that has been fully discharged, in order to avoid dangerous outgassing and to avoid shortening the life expectancy of such batteries, which can be very expensive.

Furthermore, in prior art battery charging systems, the systems typically cannot provide various types of battery charge in optimum fashion, and frequently require manual intervention in switching between various types of charging modes such as normal charge and trickle charge. For example, for a heavily discharged battery, sulfation will have normally occurred and it is necessary to not only charge the battery but also equalize the cells, i.e. bring all cells to the same voltage and to desulfate these cells. Furthermore, if a battery is overcharged, particularly during equalization and desulfating, excessive gases can be emitted which are highly undesirable. Furthermore, damage to the battery can result through overcharging. Also, once a battery has been fully charged and equalized, the battery can gradually discharge while it sits on the shelf, particularly depending upon the temperature and internal resistance of the battery. The higher the temperature, the shorter the shelf life and the greater the internal discharge of the battery which will occur with time. Another disadvantage of prior art battery chargers is the inability to compensate for wide variations in line voltage, such as may occur during field operation on power systems which are not well regulated or controlled. Furthermore, particularly in industrial applications, it is important to minimize "ripple" in the output dc. Such ripple can be line frequency ripple or load induced ripple. This is particularly true when the battery charger acts as the primary power source and the battery is employed like a "filter" to handle current surges. Previous chargers have thus required expensive components to reduce ripple to a value which will not harm the battery during charging.

A further disadvantage is that prior art battery chargers have been unable to provide various types of charging functions automatically and without manual intervention. Although some prior art battery chargers have attempted to simulate automatic equalization charging through use of preset timers, such chargers have the disadvantage that they do not respond to the actual dynamic condition of the battery at a given moment in time to determine whether or not further equalization charging is appropriate.

SUMMARY OF THE INVENTION

It is an object of the present invention to automatically switch without manual intervention back and forth between a float mode and an equalize mode of operation.

It is a further object of the present invention to reduce the cost, weight, and size of prior art battery chargers.

It is another object of the invention to substantially increase the efficiency of battery chargers.

It is a further object of the invention to provide selective control over both output voltage and current.

It is another object of the invention to automatically switch between a charge mode for charging and equalizing a battery and a "float" mode for maintaining a proper charge on the battery when the battery is or has been previously equalized.

It is a further object of the invention to provide line voltage regulation to accommodate severe line voltage variations; and it is an objective to appropriately regulate output voltage and/or current regardless of the line voltage variation.

It is another object of the invention to provide line voltage regulation which is separate and independent from load regulation.

It is another object to inexpensively reduce the ripple component in the charging voltage.

It is a further object of the invention to automatically provide a plurality of charging modes such as a heavy charge mode, a surface charge mode, a surface charge depletion mode, a float charge mode, and a working load mode; and to determine the charging conditions based on the condition and type of battery as it actually exists both at the time of initial hook-up at various times during the charging.

It is also an object of the invention to measure an ambient temperature in which a battery is being charged and to correct charging conditions in accordance with the ambient and/or battery temperature during various charging modes. Particularly, since the higher the ambient and/or battery temperature the lower is the "float" window of the battery, the charging and float modes are compensated in the present invention for temperature.

With the battery charger of the invention, an automatic switching between a float mode and an equalization mode occurs at a predetermined minimum current.

Also, according to the invention, a switch mode operation is provided at a frequency substantially higher than the line frequency. The switch mode operation provides excellent AC input voltage regulation and excellent current and voltage control at the charging outputs, regardless of severe line voltage variations. According to the invention, if a battery is heavily discharged, the battery charger during an initial heavy charge mode automatically charges the battery from a depleted voltage level up to the normal rated voltage level of the battery, the so-called float level, and initially supplies the appropriate maximum charging current for the battery type so as to properly charge the battery, but without damaging it with too great an initial current flow. In a following surface charge mode of operation, full battery equalization is achieved automatically when current flow falls to a certain value given an appropriate selected surface charge voltage higher than the normal rated battery voltage level. Thereafter, during a surface charge depletion mode the system automatically initially. provides no charging current and thus causes the battery voltage to return from the surface charge voltage automatically and without a controlled time delay to the normal rated battery voltage, the so-called "float" voltage. The system automatically seeks to provide a normal float battery voltage wherein the battery is neither being charged or discharged, a so-called float mode of operation during which the normal rated battery voltage is maintained by a charging float voltage and an appropriate current is provided to balance out any internal discharge of the battery which may occur as the battery sits on a shelf for long periods of time. In a working load mode, the charger provides the necessary load current for an external load up to the maximum charging current for the charger.

DESCRIPTION OF THE PREFERRED EMBODIMENTS

Figure 1:
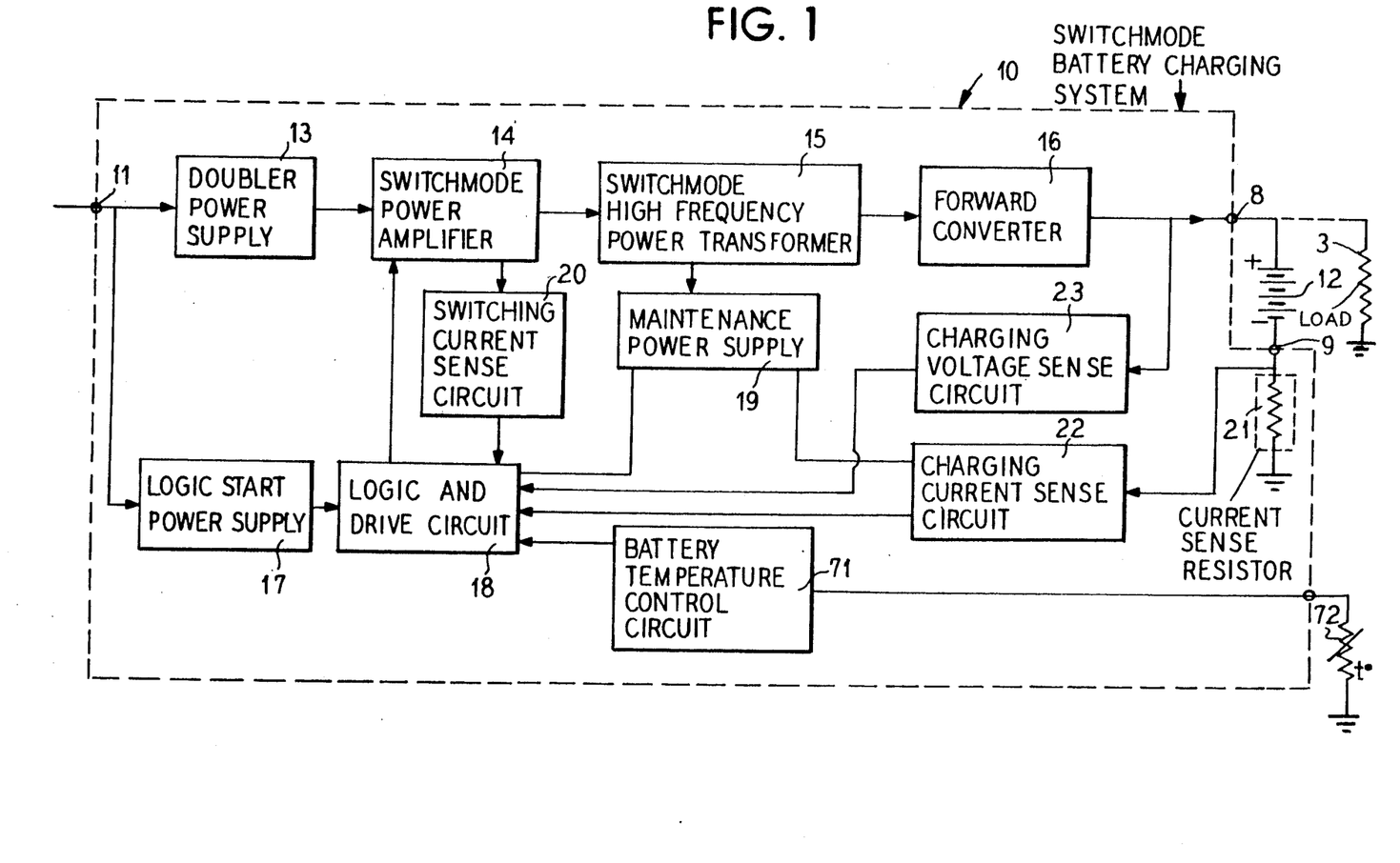
FIG. 1 is a block diagram showing a switch mode battery charging system according to the invention.

The switch mode battery charging system of the invention is generally shown in the block diagram indicated at 10 in FIG. 1. At a line input 11 the charging system receives unregulated line voltage, such as 117 VAC. The charging system connects to a battery such as a car battery, marine battery, material handling vehicle battery, etc. via terminals 8 and 9. A temperature measuring thermistor $t_0$ shown at reference numeral 72 may also be positioned adjacent the battery 12 to measure its temperature during operation. An external load 3 may be connected when the charger is used as a power supply in what is known herein as a working load mode described below.

The line input connects to a doubler power supply 13 which powers a switch mode power amplifier 14 for switching a primary of a switch mode high frequency power transformer 15, preferably operating at a relatively high frequency compared to the line voltage frequency of 60 cycles—at least as high as prior art switch mode supplies operating at 10 khz or higher, but preferably at 100 kHz, and in a range from 80-120 khz and preferably between 90-110 khz. The operating frequency in the 100 khz range according to this invention is substantially 40 khz higher than prior art designs operating at 40-60 khz. The secondary windings of the power transformer 15 provide power to a forward converter which outputs a charging voltage at appropriate charging current levels at output 8.

When the battery charging system is initially switched on, a logic start power supply 17 energizes a logic drive circuit 18 which provides the oscillation frequency and logic drive for the switch mode power amplifier 14. The logic and drive circuit is controlled by a switching current sense circuit 20 to provide regulation for various line voltages ranging from 90 through 135 volts, for example. Furthermore, the logic and drive circuit 18 receives input control signals from the battery temperature control circuit 71, the charging current sense circuit 22, and the charging voltage sense circuit 23. It is also powered after initial startup by the maintenance power supply 19.

The charging current sense circuit senses the voltage across a high tolerance current sense resistor 21 to determine current through the battery 12 during charging.

Figure 2:
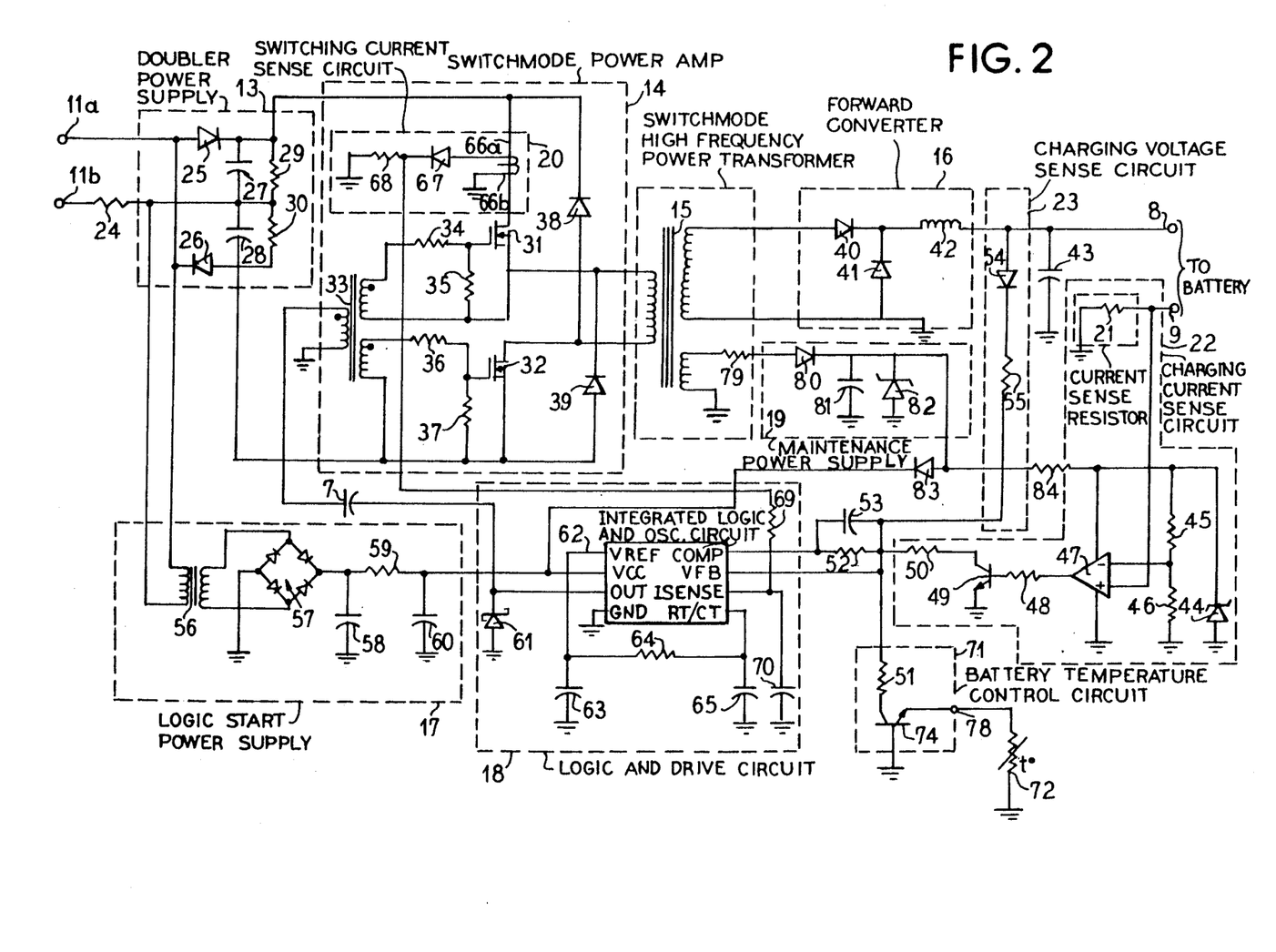
FIG. 2 is a schematic diagram showing in greater detail the construction of the circuit shown in FIG. 1.

Further details of the various circuit blocks can be seen in FIG. 2 as described hereafter.

The doubler power supply 13 has diodes 25 and 26 together with charging capacitors 27 and 28 with bleeder resistors 29 and 30 thereacross. Power is fed to the doubler power supply 13 via line inputs 11a, 11b. A surge suppressor 24 connects to terminal 11b.

The switch mode power amplifier 14 has a driver transformer 33 whose primary is controlled through capacitor 7 by an output of an integrated logic and oscillator circuit 62, a Schottky diode 61 being connected to ground at said output. The two secondaries of the driver transformer 33 control power MOS FETs 31 and 32 through resistor networks 34, 35, 36, and 37, respectively. The switch mode power amplifier outputs connect to the primary of the switch mode high frequency power transformer 15. Clamping diodes 3 and 39 provide voltage from the doubler power supply to the MOS FETs and to the transformer primary.

The switch mode high frequency power transformer 15 has two secondary windings connected to a forward converter 16 formed of a diode 40 and a free-wheeling diode, 41 which connect through an energy storage toroidal inductor 42 to the output 8. A filter capacitor 43 is provided at the output 8.

By use of a doubler power supply, high efficiency results, since higher voltage is provided at a lesser current so as to minimize I2R losses and to permit use of less expensive power MOSFETS. Also, the filtering at the higher voltage and lower current is easier. Clamping diodes 38 and 39 reset the transformer 15 flux in preparation for the next firing of the MOSFETS 31 and 32. This effectively supplies power to the transformer when the MOSFETS 31 and 32 are off thus making the circuit very high in efficiency like push-pull operation but without necessity of MOSFETS which would have double the voltage rating.

The logic start power supply 17 has a small power transformer 56 connecting to a bridge rectifier 57 and to an output filter formed of capacitors 58, 60 and resistor 59. Capacitor 60 is a storage capacitor to sustain operation until capacitor 81 is charged.

The maintenance power supply 19 is formed of a secondary winding on the switch mode power transformer 15 and comprises a series resistance 79, rectifying diode 80, filter capacitor 81, and diode 82. The output of this power supply 19 connects through diode 83 to a voltage input VCC of the integrated logic and oscillator circuit 62, and also through a resistor 84 to a comparator 47 of the charge current sense circuit 22.

The charging voltage sense circuit 23 is formed of a diode 54 and resistor 55 which feeds voltage through resistor 52 and capacitor 53 to a COMP input of the logic circuit 62. The logic circuit 62 is preferably a TSC38C44 integrated circuit. This logic circuit has a CMOS output at OUT so as to supply the relatively high power necessary to directly drive the two MOSFETs 31, 32 in parallel.

The charging current sense circuit 22 detects the voltage across the current sense resistor 21 and connects this voltage to the positive input of the comparator 47. The negative input of the comparator 47 connects to a voltage divider formed of resistors 45, 46 and a Zener diode 44 which sets a reference voltage.

The output of the comparator 47 connects through resistor 48 through a switching transistor 49 whose output connects through resistor 50 to the VFB logic circuit input and to the COMP logic circuit input through resistor 52 and capacitor 53.

A battery temperature control circuit 71 is provided wherein the battery and/or ambient temperature measuring thermistor or sensor 72 connects at input terminal 78 to an emitter of a transistor 74 having its base grounded. The output of a collector thereof connects through resistor 51 to the VFB input of integrated circuit 62. The sensor 72 is preferably attached to a side of the battery so as to measure both battery temperature and the effect of ambient temperature.

A switching current sense circuit 20 has a winding 66b which senses current through a conductor 66a. This winding 66b connects through a diode 67 and resistor 69 to an I sense input of the logic circuit 62. A resistor 68 is provided between the diode 67 and ground.

The logic and drive circuit 18 has a frequency determining circuit established by capacitor 65 and resistor 64 connected at the RT/CT terminal of the logic circuit 62. A V-REF terminal of the logic circuit 62 connects to a capacitor 63 to ground and also to the resistor 64.

Various characteristics and operation of the switch mode battery charging system of the invention will now be described.

With the switch mode power supply system of the invention, the line input voltage to the battery charger may vary from 90 through 135 volts (for example about a 20% line voltage deviation) without substantially affecting the output voltage and output current during the various battery charging modes. Furthermore, with the switch mode system of the invention, the high frequency power transformer 15 can be designed to occupy a small amount of space, to be very light weight, and to have a very high efficiency. Similarly, the driver transformer 33 can be very light weight as can the energy storage toroid 42. Furthermore, filtering may be accomplished with relatively smaller capacitors in view of the very high operating frequency of the system (for example, 100 kHz). Thus, efficiency, space, and weight, together with the ability to regulate for a wide variety of line voltage conditions is obtained with the greatly improved switch mode battery charging system according to the invention.

Not only does the system have the aforementioned attributes, but it is also designed to automatically provide a variety of optimum charging modes depending upon the initial discharge condition of the battery. These various charging modes can be understood from the charging voltage V and charging current I curves versus time shown in the graph of FIG. 3.

By way of example only, charging of a 100 ampere hour lead/acid battery having a fully charged design voltage of 13 volts known as the "float" voltage has been shown. This is the middle of the so-called float window where the battery is neither being charged or discharged. However, it must be appreciated that the present invention is applicable to a wide variety of battery voltages and battery amp-hour capacities, and for various types of batteries.

A variety of charging conditions can exist for a given battery. First, it will be assumed that the 100 amp-hour battery assumed here by way of example is discharged to a large extent and requires a heavy charge. Typically with such a battery cell sulfation has occurred and the voltages of the various cells (for example, 6 cells of about two volts each for a 12-volt lead/acid battery) may not have equal voltages relative to one another. Accordingly, as is known in the art it is necessary to not only charge the battery but also to equalize the voltage of the cells relative to one another and to desulfate all of the cells in what is known as an equalization process. In such an equalization process, it is necessary to provide a surface voltage charge which is greater than the typical fully charged normal rated battery voltage in order to substantially completely desulfate the battery plates and to equalize the cells.

Figure 3:
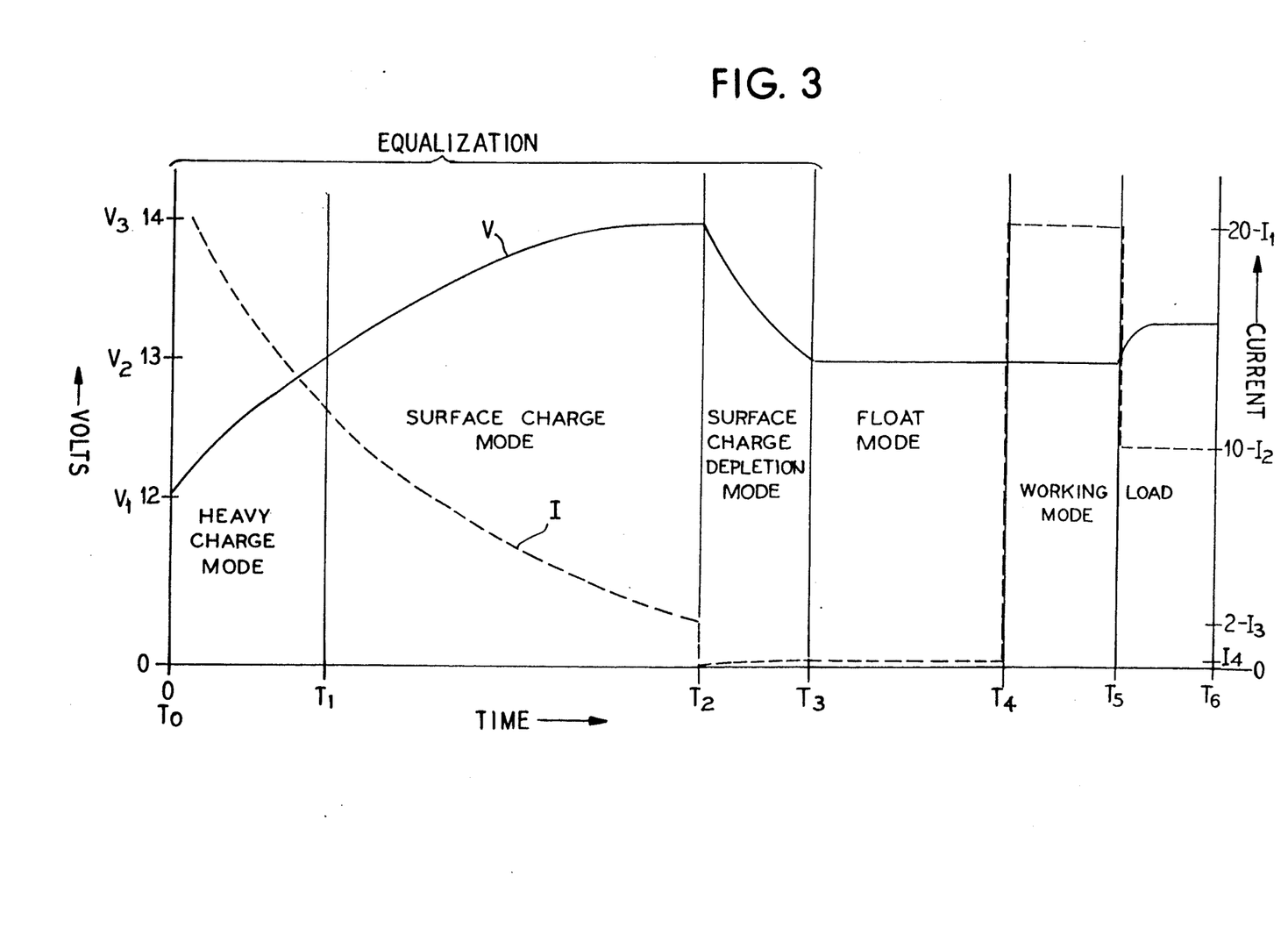
FIG. 3 is a graph showing battery charging voltage and battery charging current versus time to explain the various modes of operation of the switch mode battery charging system shown in FIGS. 1 and 2.

During the initial heavy charge mode from T0 to T1 (which is part of the battery equalization), the system automatically switches into an equalization mode (since the charging current is greater than the minimum charging current $I_3$ being sensed for) and brings the battery through its nominal rated fully charged "float" voltage of 13 volts (the float voltage for a typical 100 amp-hour lead/acid 12-volt battery) as it proceeds toward the targeted surface charge voltage V3 of about 14 volts described hereafter. The battery charging system of the invention thus begins at the discharged voltage of the battery such as V1 (here assumed to be about 12 volts) and brings it up to and through the float voltage of V2 (here assumed to be 13 volts). This occurs at time T1. The current supplied by the system indicated by curve I begins at a selected initial full charging current selected for the particular battery type being charged. By limiting the maximum charging current the battery life is prolonged by preventing too much current flow which could damage the battery. For the 12 volt 100 amp-hour lead/acid battery assumed here, a maximum charging current of 20 amps is appropriate. The current then falls from this initial maximum current rating I1 to an intermediate current rating I2, for example about 11 amps at T1. Thereafter, in order to provide a surface charge and complete equalization and desulfation, the system continues to charge the battery up to a maximum target voltage of 14 volts (the surface charge voltage V3 appropriate for the battery assumed here). This voltage V3 is chosen by experience and manufacturers' ratings. Of course it can vary depending on the type of battery. The system also supplies a decreasing charge current I established by the battery. When this charge current I finally reaches the selected minimum value I3 which originally initiated the equalization mode (here assumed to be 2 amps), the system then automatically determines that the surface charge mode has been completed. If the system reaches the targeted maximum surface charge voltage V3 (here assumed to be 14 volts) prior to the charge current I reaching $I_3$ (2 amps), the voltage is then stabilized and made substantially constant by the system at V3 (14 volts) until the current reaches I3 (2 amps) (Of course, the system may not reach this "target" voltage if the current $I_3$ falls below the $I_3$2 amp point before the target voltage is attained). At this point, the system automatically shuts off all current to the battery and causes the battery voltage to naturally fall without a controlled time delay from its surface charge voltage of V3 down to its nominal "float" voltage of V2 at which the system provides a charging float voltage. As the falling voltage nears the float voltage, the battery beg to appear as a slight load to the charger in view of internal resistance or leakage current. As a result, a small current rising current occurs. At time T3, this levels off at a so-called float current I4 just sufficient to balance internal battery current loss value, a time which can vary depending upon the charge state and type of battery. Thus, when the battery voltage has attained its float voltage of V2, then from time T3 through some future time such as T4, a maintenance or float mode is automatically maintained in which a charging float voltage is applied. This mode corresponds to a storage time of the battery in which a full charge is to be maintained in the middle of the float window - that is, the battery is neither charging or discharging. The charging system of the invention automatically provides the small maintenance or float current I4 which is equal to and balances any discharge current which occurs naturally in the battery as it sits in storage or non-use. In other words, the float current I4 balances the internal leakage resistance or leakage current of the battery during storage. Thus, during this float mode the battery is neither over-charged or undercharged, but is automatically maintained at the normal rated fully charged voltage, and just the proper charge rate is provided. Further, since temperature is monitored, the charging float is adjusted appropriately and automatically.

Alternatively, if the initial charge current is less than I3 such as would occur if the initial battery voltage was its fully charged design voltage or greater (here assumed to be V2 equal to 13 volts), then the system automatically avoids the modes associated with equalization—namely the heavy charge mode and surface charge mode, and automatically provides the float mode of operation (possibly preceded by the surface charge depletion mode if the battery is above the fully charged 13 volt point) where only a maintenance current I4 is provided at the rated fully charged float battery voltage V2.

In a so-called "working load mode" beginning at T4, it is assumed that a working load 3 shown in FIG. 1 is connected across the battery 12. This may occur in practice when it is desired to use the charger as the primary power source for the load and to use the battery to supply load surge currents above a typical operating current. The charger of this invention will provide as shown from time T4 to T5 a maximum and constant current of 20A. At this maximum current, the system is designed to provide the float voltage V2 of 13 volts. At time T5 to T6, if for example the load drops to 10A, then the charger will supply this current and will allow the battery voltage to rise to a new level above the charging float voltage but less than the maximum surface charge voltage V3 (14 volts).

The charging voltage sense circuit 23 and charging current sense circuit 22 detect for these various voltage and current conditions described above—and most importantly sense for the surface charge voltage V3 and the equalization current I3 indicating completion of surface charging for equalization. The circuit thus can determine automatically whether or not an equalization mode is necessary, and when to initiate and end the equalization and float modes of operation.

Of particular interest is the establishment of the float voltage V2 by the battery charger of the invention. As can be seen in FIG. 2, when the current drawn from the battery charger is less than 2 amps, the threshold detector 47 causes transistor 49 to be in an off condition. Accordingly, the voltage at point VFP to the integrated logic circuit chip 62 is established by the voltage division between the voltage divider formed by resistors 55, and 51. These resistances are chosen such that the output charging float voltage will be substantially at the desired nominal float voltage—in this case approximately 13 volts. Thus, when the current being drawn from the system is less than 2 amps, the output voltage will always seek to become the float voltage of 13 volts. For example, during the surface charge depletion mode from T2 to T3, the system automatically returns to its normal operating voltage corresponding to the charging float voltage of 13 volts. However, when more than two amps is drawn (current I3), then the threshold detector 47 switches transistor 49 into an on state so that resistor 50 parallels resistor 51 so as to attempt to lower the voltage at VFB. However, since the feedback arrangement of the present system will not permit the voltage at VFB to go to a lower value, the system automatically raises the voltage at the output 8 to the so-called surface charge voltage of 14 volts (V3 in FIG. 1).

By providing the temperature sensor 72 in association with the battery, the various charging modes can be compensated so that somewhat different charging voltages and currents can be employed depending on the temperature of the battery. Specifically, as temperature goes up, the float voltage and the maximum voltage decrease.

From a reliability and safety and protection standpoint, the output of the charger can be short-circuited without damage to the charger since the charger will automatically revert to a "shut down" mode also known as a "hic-cup" mode. The "hic-cup" mode results in view of 0 volts on the power transformer main secondary winding which causes 0 volts on the maintenance power supply winding, thus effectively shutting down the logic and drive circuit except for brief bursts of minimal current.

To minimize radiation from the charger, a metal ground plane layer is provided on a top side of the printed circuit board adjacent the mounting location for the switch-mode transformer. Also, the drive transformer 33 has all three windings identical and in phase and has the driver winding positioned centrally relative to the two secondary windings in order to obtain exactly the same drive to minimize interference. The switch mode transformer also has a round center post for improved efficiency.

By use or the switch mode power supply of the invention, maximum charging current can be precisely chosen and controlled, and a constant voltage can be maintained, such as may be appropriate during the end of the equalization mode.

Although various minor changes and modifications might be proposed by those skilled in the art, it will be understood that we wish to include within the claims of the patent warranted hereon all such changes and modifications as reasonably come within our contribution to the art.

I claim as my invention:

1. A battery charger for a battery, comprising
a controllable power supply means for providing a variable output voltage at varying charging currents;
equalize mode sensing means connected to control the power supply means such that when a charging current is sensed which is above a predetermined minimum values, the power supply means causes the charging voltage to begin a continuing increase from an existing voltage to which the battery was charged up to a higher desired target surface charge equalizing voltage for desulfating the bat- 23. A system according to claim 22 wherein a driver transformer is connected to drive the two switching transistors, said driver transformer having a primary winding and first and second secondary windings arranged symmetrical to the drive winding, the two secondary windings having a same inductance.

24. A system according to claim 3 wherein the switch mode power supply means has means for preventing normal switch mode operation when a short circuit is present at its output so as to substantially limit current flow at the output.

25. A system according to claim 24 wherein said means for preventing normal switch mode operation permits only short bursts of current to occur at the output during the short circuit.

26. A system according to claim 3 wherein the switch mode power supply means has a switch mode power transformer with a principal secondary winding supplying the charging voltage and a maintenance secondary winding supplying a maintenance power supply means for providing operating voltage to a portion of the switch mode power supply means, and wherein when a short circuit occurs across said principal winding, a voltage across said maintenance secondary winding becomes substantially zero.

27. A battery charging system operable from an AC line voltage supply of a given line frequency, comprising:
an AC line voltage input for connection to the line voltage supply;
a switch mode power supply mans for being operated from the AC line voltage supply and for providing at its output a variable and controllable DC voltage at variable and controllable currents up to a maximum selected current, the current being variable simultaneously with a variance of the voltage during charging:
said switch mode power supply means having an operating frequency substantially higher than said line frequency of said AC line voltage supply; and
said switch mode power supply means including means for automatically switching from a float mode in which a battery maintenance current at a charging float voltage can be supplied substantially equal to an internal discharge current of the battery to a heavy charge and equalizing mode in which current substantially higher than the maintenance current can be provided, said automatic switching occurring when current at the output of the system exceeds a predetermined level, and wherein during said heavy charging and equalizing mode, the battery is charged up to an equalizing voltage which is higher than the charging float voltage until a predetermined minimum charging current is reached, at which time the system automatically switches to the float mode and the battery voltage drops, without a controlled time delay, from the equalizing voltage it was at when the charging current reached its minimum value down to the lower charging float voltage at which said battery maintenance current is supplied.

28. A battery charging system for charging a battery to a selected substantially fully charged float voltage, comprising:
power supply means for providing at an output a variable battery charging DC voltage which is controlled to not exceed a selected maximum surface charge voltage for equalizing cells of the battery and desulfating, and a variable charging current which is controlled not to exceed a maximum selected charging current and which decreases from the maximum charging current as a charging DC voltage is increasing toward an equalizing voltage above the float voltage; and
automatic control means connected to the power supply means for detecting whether or not the charging current is above or below a given value, and if it is above then instituting an equalization charging mode for charging the battery up to the selected surface charge voltage for desulfating which is above the float voltage, and if the charging current of the battery has fallen below and given value thus indicating completion of the equalization and desulfation, then automatically terminating the charging mode by stopping the charging current, and, in a surface charge depletion mode, causing a voltage applied to the battery to automatically fall back without a controlled time delay to a charging float voltage.

29. A system according to claim 28 wherein at a completion of the surface charge depletion mode when the substantially fully charged float voltage is attained, in a float mode maintaining a maintenance current on the battery which substantially balances internal battery charge loss during non-use.

30. A system according to claim 28 wherein the power supply means comprises a switch mode power supply operating at a frequency substantially above a frequency of the AC line voltage.

31. A battery charging system operable from AC line voltage having a given line frequency associated therewith, comprising:
an AC line voltage input;
a switch mode power supply means connected to operate from the AC line voltage input and for providing at its output DC battery charging voltages at DC charging currents;
said switch mode power supply means having an operating frequency substantially higher than said line frequency at said AC line voltage;
automatic control means connected to the switch mode power supply means for detecting whether a charging current being drawn by a battery to be charged is above or below a selected given value, and if it is above then instituting an equalizing mode for equalizing and desulfating the battery by having the system seek float voltage of the battery, and when the charging current falls below said selected given value, said automatic control means causing the battery voltage to drop, without a controlled time delay, from said surface charge voltage down to a charging float voltage; and
means for adjusting said charging float voltage on the battery during the float mode so that a float current is delivered to the battery which equals an internal discharge current of the battery.

32. A battery charging system operable from AC line voltage having a given line frequency associated therewith, comprising:
a AC line voltage input;
a switch mode power supply means connected to operate from the AC line voltage input and for providing at its output a varying DC battery charging voltage which varies simultaneously with varying DC charging currents;

tery, said power supply means providing a decreasing charging current at the same time the charging voltage is approaching said equalizing voltage, and when said decreasing charging current drops below said minimum value, said equalize mode sensing means causes, without a controlled time delay, the power supply means to drop down to a charging float voltage for just maintaining a full charge, said equalizing voltage when said charging current reaches the minimum value being higher than said charging float voltage.

2. A battery charger according to claim 1 wherein said equalize mode sensing means comprises a comparator having at a first input a reference voltage and at a second input a voltage proportional to the charging current, and wherein said comparator is connected to control a switch means for providing a signal to begin increasing the charging voltage upwardly toward the target equalizing voltage.

3. A battery charger system for charging a battery and which is operable from an AC line voltage supply of a given line frequency, comprising:
an AC line voltage input for connection to the line voltage supply;
a switchable power supply means for being operated from the AC line voltage supply and for providing at its output a continuously variable and controllable DC battery charging voltage at variable and controllable charging currents, and wherein during a charging mode the charging voltage continuously increases up to an equalizing voltage while the charging current is decreasing from an initial maximum charging current as the equalizing voltage is approached, and when the charging current drops below a given value, the charging voltage automatically dropping, without a controlled time delay, from an equalizing voltage existing at that time down to a lower charging float voltage in a float mode for just maintaining a full charge; and
said switch mode power supply means having an operating frequency substantially higher than said line frequency of said AC line voltage supply.

4. A system according to claim 3 wherein in the float mode the float voltage of the battery is maintained with a float current which equalizes internal battery discharge with the battery not externally loaded.

5. A system according to claim 3 wherein a voltage divider connected to a feedback control circuit sets the float voltage, and switch means is connected to the voltage divider for setting the system to attain a surface charge voltage above the float voltage when the charging current is greater than said given value,.

6. A system according to claim 3 wherein said switch mode power supply means includes means for automatically switching from the float mode in which a maintenance current is being supplied to the battery to the charge mode in which a current substantially higher than the maintenance current is provided, said automatic switching occurring when charging current at the output of the system exceeds said given value.

7. A system according to claim 3 wherein said switch mode power supply means operating frequency is greater than 10 kHz.

8. A system according to claim 3 wherein said switch mode power supply means comprises a high frequency power transformer having a primary connecting at opposite ends to first and second power switching semiconductors.

9. A system according to claim 8 wherein a doubler power supply provides a voltage to the primary of said power transformer.

10. A system according to claim 3 wherein said switch mode power supply means has a forward converter means with an energy storage inductor and a free-wheeling diode.

11. A system according to claim 3 wherein said switch mode power supply means has line voltage regulating means for accommodating fluctuations of the line voltage of at least 10% without substantially effecting the output charging voltage and charging current.

12. A system according to claim 11 wherein the accommodated line voltage fluctuations are at least 20%.

13. A system according to claim 3 wherein including means for determining whether a voltage of a battery to be charged is above or below the float voltage, and if it is below the float voltage, then charging the battery up in the charge mode.

14. A system according to claim 3 wherein said switch mode power supply means includes a logic and drive circuit means for controlling a switch mode power amplifier, said logic and drive circuit means having a charging voltage sense circuit means connected thereto for detecting a voltage on the battery being charged and a charging current sense circuit means connected thereto for detecting a current flowing through the battery during charging.

15. A system according to claim 3 wherein the switch mode power supply means includes a switch mode power transformer having connected to its primary semiconductor switching means, and wherein a switching current sense circuit means is provided for sensing a switching current flowing through the semiconductor switch means and for providing a control output to a logic control circuit means connected for controlling the semiconductor switch means.

16. A system according to claim 3 wherein said switch mode power supply means includes a switching current sense means for compensating for line voltage fluctuations.

17. A system according to claim 3 wherein means is provided such that in a working load mode the system provides a working load current equal to or less than a maximum charging current for the system required to operate a load connected across the battery, said means including means for preventing said working load current from exceeding said given maximum charging current for the system.

18. A system according to claim 3 wherein said switch mode power supply means operating frequency is in a range from 80 to 120 kHz.

19. A system according to claim 18 wherein the operating frequency is in a range from 90 to 100 kHz.

20. A system according to claim 19 wherein the operating frequency is 100 kHz.

21. A system according to claim 3 wherein said switch mode power supply means includes a doubler power supply, first and second clamping diodes connecting to the switching transistors and power transformer.

22. A system according to claim 3 wherein the switch mode power supply means includes a power transformer switched by first and second switching transistors all mounted at a side of a circuit board having a ground plane conductive layer, an opposite side of the circuit board having printed circuit wiring tracks.

said switch mode power supply means having an operating frequency substantially higher than said line frequency at said AC line voltage;

said switch mode power supply means having a high frequency power transformer having a primary connecting at opposite ends to first and second power switching semiconductor; and automatic control means connected to the switch mode power supply means for maintaining a selected float voltage of the battery by providing a maintenance current which just balances internal battery loss currents, and for causing the power supply means to provide a desulfating voltage which is higher than the float voltage and for automatically detecting a selected minimum desulfating current level indicative of completion of desulfation and at that time automatically returning the battery, without a controlled time delay, to a charging float voltage.

33. A system according to claim 32 wherein the automatic control means prevents the desulfating voltage from exceeding a selected maximum desulfating voltage.

34. A battery charger for a battery, comprising:

a controllable power supply means for providing a variable output charging voltage at a varying charging current;

desulfating mode sensing means connected to control the power supply means such that when a charging current is sensed which is above a predetermined minimum value, the charging voltage begins to continuously increase from an existing voltage which the battery was at up to a higher desired target surface charge desulfating voltage for desulfating the battery, and when said charging current drops below said minimum value for automatically causing the power supply means to drop down to a charging float voltage which is lower than a desulfating voltage at which the battery was being charged when it reached said minimum value of charging current, said charging float voltage being supplied at a maintenance current for just maintaining a charge on the battery; and means for adjusting the charging float voltage such that the maintenance current is equal to an internal discharge current of the battery.

* * * * *

UNITED STATES PATENT AND TRADEMARK OFFICE
CERTIFICATE OF CORRECTION

PATENT NO. : 5,166,595
DATED : November 24, 1992
INVENTOR(S) : Charles G. Leverich It is certified that error appears in the above-indentified patent and that said Letters Patent is hereby corrected as shown below:

Column 4, line 22, replace "3" with --38--
Column 6, line 48, replace "13" with --I3--
　　　　　line 56, replace "13" with --I3--
　　　　　line 58, replace "I$_3$2 amp" with --I$_3$　2 amp--
　　　　　line 65, replace "beg" with --begins--
　　　　　line 67, replace "current" (second occurrence deleted)
　　　　　line 68, replace "At time T3, this levels off" with --At time T-3, this current--

Column 7, line 15, replace "14" eith --I4--
Column 8, line 10, replace "13" with --I3--
Column 10, claim 13, line 1 delete "wherein"
Column 10, claim 19, line 3 replace "100" with --110--
Column 10, claim 21, after supply, should read --,first and second switching ttansistors connected to a driver power transformer, and;
Column 11, claim 27, line 31, replace "mans" with --means--
Column 12, claim 31, line 50, after "seek" should read --to charge the battery up to a surface charge voltage above a normal--

Signed and Sealed this

Twenty-fifth Day of January, 1994

Attest:

BRUCE LEHMAN

Attesting Officer　　　Commissioner of Patents and Trademarks